UNITED STATES PATENT OFFICE.

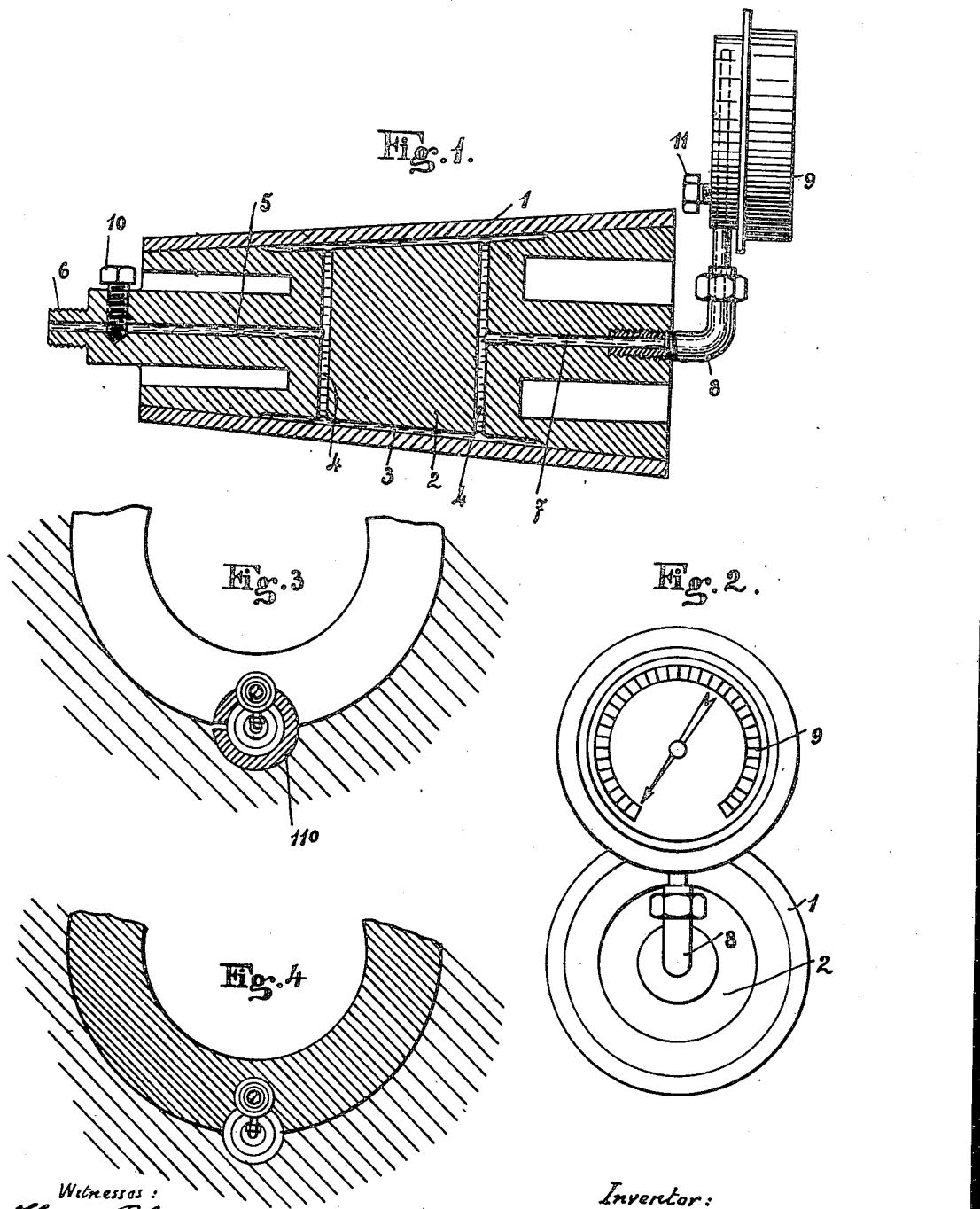

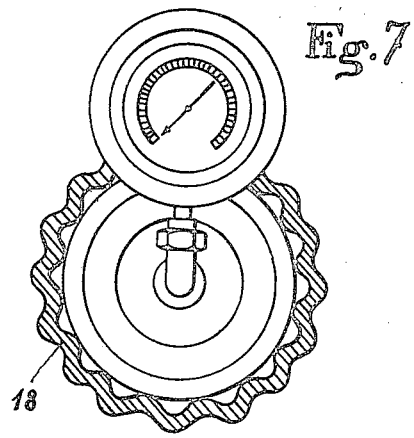
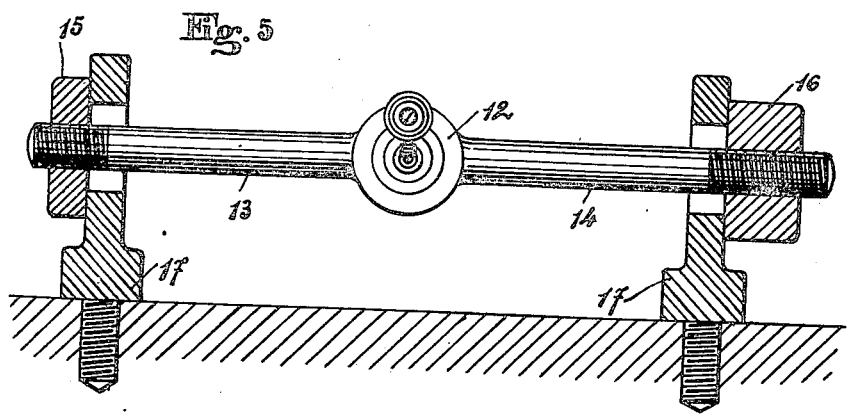
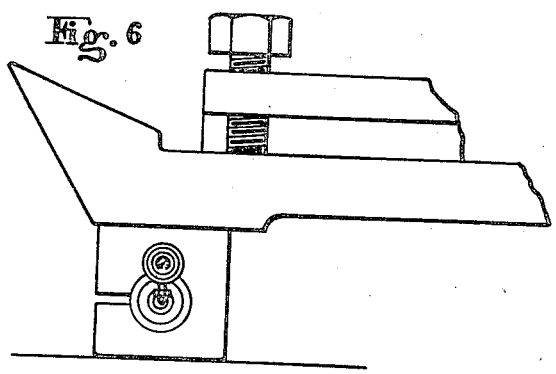

LOUIS RODOLPHE WALTER BOULASSIER, OF PARIS, FRANCE.

APPARATUS FOR MEASURING THE VALUE OF THE EFFORTS AND OF THE DEFORMATIONS TO WHICH ORGANS ARE SUBMITTED WHEN WORKING.

1,425,506.	Specification of Letters Patent.	Patented Aug. 15, 1922.

Application filed April 8, 1921. Serial No. 459,810.

*To all whom it may concern:*

Be it known that I, LOUIS RODOLPHE WALTER BOULASSIER, a citizen of the French Republic, residing at Paris, France, have invented certain new and useful Improvements in apparatus for measuring the value of the efforts and of the deformations to which organs are submitted when working, of which the following is a specification.

The apparatus according to this invention permits to measure very rapidly by direct or indirect measuring the efforts and the deformations to which organs at work are submitted. This measuring is effected by the variation of an inner pressure of a capacity by the action of a stress exerted upon this latter, and which provokes the deformation of a part of the apparatus which is more or less deformable.

This apparatus can be used in laboratories, testing departments, in connection with works of art (for the verification of calculations, for controlling whether the object is in proper state and the like), or everywhere where it is necessary to ascertain at any moment and without interruption of service the value of the efforts exerted or of the deformations which are produced.

In order that the invention may be clearly understood, I shall proceed to describe the same with reference to the form of execution and to the several manners of application shown by the accompanying drawing, wherein:—

Fig. 1 is a vertical section of the apparatus.

Fig. 2 is a front view of the same.

Figures 3 and 4 illustrate applications of the apparatus for measuring the effort exerted by a bearing.

Fig. 5 illustrates the application of the apparatus for measuring the effort exerted by tie-rods, Fig. 6 shows the apparatus mounted upon a slide of a lathe for measuring the work done by the tool upon the work piece.

Fig. 7 shows the apparatus in connection with an amplifier of the deformation.

1 is the outer tubular conical part of the apparatus in which a mandrel 2 provided with a groove 3 is arranged. 4 are passages which establish the connection, on the one hand by means of a conduit 5 with an inlet socket 6 and, on the other hand by the conduit 7 with the tube 8 of a pressure gauge 9 which, if necessary, could have two graduations, one for the efforts and the other for the deformations.

10 is a screw for obturating the conduit 5 when the apparatus is filled, under pressure, with an incompressible substance, e. g. oil, glycerine, mercury or the like. 11 is a regulating screw at the end of the gauge tube which is gradually screwed in when the injected liquid under pressure appears at this end.

These parts are adjusted the one with regard to the other by conical assembling, the deformation being effected by the bending of the ends which are unsupported (see Figure 1).

The form adopted for the capacity can vary according to the conditions of use of the apparatus.

The apparatus works as follows:—Under the effort of the parts between which the apparatus is interposed the capacity is deformed, its inner pressure increasing in consequence of the deformation which is registered and amplified by the gauge tube. This gauge tube forms an integral part of the liquid capacity and is for this reason completely filled with liquid.

The measuring of an effort is effected either directly by the apparatus, which has previously been calibrated, in which case the effort is composed of the effort due to the elastic bending of the organs plus the effort due to the inner pressure, or it is measured by interposition of an intermediary elastic organ in which case the effort is increased by the resistance of this latter element.

The measuring of a deformation is either effected directly by the apparatus which has been previously calibrated or by the interposition of an intermediary elastic organ the deformation of which is translated by an effort registered by the measuring apparatus.

All these operations require the utilization of a previously calibrated apparatus, the regulating of the same being effected by the displacement of the point at which the gauge tube is attached upon the drive of the indicating hand.

The amplitude of the deflection of the hand is a function of the effort, of the active surface, of the elasticity of the apparatus and of the rigidity of the flexible tube of the pressure gauge.

The variation of internal pressure of an elastic capacity filled with a not easily compressible liquid by the action of an effort or of a deformation upon this capacity is one of the means for transmitting this pressure upon the gauge hand, wherefrom results the deformation under the internal pressure of a part of this capacity which is more particularly deformable with amplification of the original deformation.

Figure 3 of the drawing shows how the pressure of a bush upon its cage is measured by means of the apparatus described with the aid of a calibrated piece 110 whilst Figure 4 shows the same apparatus being directly submitted to the effort of the bush. Figure 5 represents the apparatus for the measuring of a deformation caused by the bending of a tie-rod.

The apparatus is mounted in the eyes 12 of the tie-rods 13, 14 which are submitted to a traction effort by the nuts 15, 16 which are screwed upon the threaded parts of the tie-rods and bear against fixed uprights 17. The pressure exerted by the nuts 15, 16 upon the uprights 17 acts upon the outer wall of the apparatus, deforms the same in compressing the liquid which, as it cannot expand, acts upon the gauge hand which thus indicates the degree of deformation.

If the effort has to be ascertained which is absorbed by a lathe tool at work it is sufficient to mount under this tool an apparatus surrounded by a calibrated ring which transmits its deformations to the apparatus where they are at once indicated on the gauge by the hand.

When large bending efforts have to be measured an undulated tube 18 such as shown in Fig. 7, is placed around the apparatus.

I claim:—

An apparatus for measuring the efforts and the deformations produced in the course of work by means of the variation of a capacity which causes the variation of the internal pressure of a liquid which is not compressible and which transmits the indication of the effort to the hand of a pressure gauge comprising in combination with the gauge an outer conical tube and a conical mandrel in said tube having a long hollow cavity in its surface extending around the middle part of said mandrel, two transverse passages one near the front end and the other near the rear end of said cavity, a central conduit extending from said front transverse passage to the front end of said mandrel and a second central conduit extending from said rear transverse passage to said gauge.

In testimony whereof I affix my signature in presence of two witnesses.

LOUIS RODOLPHE WALTER BOULASSIER.

Witnesses:
ANDRÉ BLOUIN,
ROBERT BLOUIN.